(12) United States Patent
Schubert et al.

(10) Patent No.: US 10,889,350 B2
(45) Date of Patent: Jan. 12, 2021

(54) BICYCLE GEARING HAVING A NONCIRCULAR CHAINRING

(71) Applicant: Move Bikes GmbH, Muhlhausen (DE)

(72) Inventors: Stefan Schubert, Muhlhausen (DE); Tobias Sprote, Muhlhausen (DE); Marcus Rochlitzer, Muhlhausen (DE)

(73) Assignee: Move Bikes GmbH, Muhlhausen (DE)

( * ) Notice: Subject to any disclaimer, the term of this patent is extended or adjusted under 35 U.S.C. 154(b) by 172 days.

(21) Appl. No.: 16/077,093

(22) PCT Filed: Feb. 10, 2017

(86) PCT No.: PCT/EP2017/053083
§ 371 (c)(1),
(2) Date: Nov. 8, 2018

(87) PCT Pub. No.: WO2017/137610
PCT Pub. Date: Aug. 17, 2017

(65) Prior Publication Data
US 2019/0061871 A1   Feb. 28, 2019

(30) Foreign Application Priority Data

Feb. 12, 2016 (DE) .................. 10 2016 001 660
Apr. 22, 2016 (DE) .................. 10 2016 004 888

(51) Int. Cl.
*B62M 11/14* (2006.01)
*B62M 3/06* (2006.01)
(Continued)

(52) U.S. Cl.
CPC ............... *B62M 3/06* (2013.01); *B62M 9/08* (2013.01); *B62M 11/02* (2013.01); *F16H 1/28* (2013.01);
(Continued)

(58) Field of Classification Search
CPC . F16H 55/30; F16H 35/00; F16H 1/28; F16H 2035/003; B62M 3/06; B62M 11/02; B62M 9/08; B62M 11/14
(Continued)

(56) References Cited

U.S. PATENT DOCUMENTS 3,375,022 A * 3/1968 Hattan ............... B62M 9/08
280/238
3,899,932 A * 8/1975 Durham ............. B62M 9/08
474/141
(Continued)

FOREIGN PATENT DOCUMENTS

| EP | 0262841 A2 | 4/1988 |
| JP | 09020281 A * | 1/1997 |
| WO | 2013191572 A1 | 12/2013 |

OTHER PUBLICATIONS

English Translation of International Preliminary Report on Patentability for PCT/EP2017/053083.
(Continued)

*Primary Examiner* — Roger L Pang
(74) *Attorney, Agent, or Firm* — Buchanan Ingersoll & Rooney PC (57) ABSTRACT

The invention relates to a bicycle gearing, comprising: a cylindrical-gear gearing (10), which has a stationary sun gear (11) having a central bearing axis ($y_1$) extending centrally therein and a planet gear (12), which travels on the sun gear (11) and rotates about a planet-gear bearing axis ($y_2$); a four-bar linkage (20), which interacts with the cylindrical-gear gearing (10) and which comprises a crank (21), which is fixedly connected to the planet gear (12) and is rotatably connected to a pedal crank (22); and a toothed wheel (30), by means of which a traction means (31) can be driven. The problem addressed by the invention is that of improving a bicycle gearing of the type in question in such
(Continued)

a way that a rounder pedaling feel is perceived by the bicycle rider. The problem is solved according to the invention in that the toothed wheel (30) has an oval shape.

13 Claims, 5 Drawing Sheets

(51) Int. Cl.
  *B62M 9/08*   (2006.01)
  *B62M 11/02*  (2006.01)
  *F16H 1/28*   (2006.01)
  *F16H 35/00*  (2006.01)
  *F16H 55/30*  (2006.01)
(52) U.S. Cl.
  CPC ............. *F16H 35/00* (2013.01); *F16H 55/30* (2013.01); *F16H 2035/003* (2013.01)
(58) Field of Classification Search
  USPC ........................................................ 475/213
  See application file for complete search history.

(56) References Cited

U.S. PATENT DOCUMENTS

| | | | |
|---|---|---|---|
| 4,193,324 A | | 3/1980 | Marc |
| 5,207,119 A | * | 5/1993 | Garneau .................. B62M 3/04 |
| | | | 475/331 |
| 2007/0246908 A1 | * | 10/2007 | Shu .......................... B62M 9/00 |
| | | | 280/261 |
| 2009/0280937 A1 | * | 11/2009 | Greene .................... B62M 3/00 |
| | | | 474/78 |
| 2019/0225300 A1 | * | 7/2019 | Sprote .................. B62M 11/145 |

OTHER PUBLICATIONS

International Search Report of the International Searching Authority for PCT/EP2017/053083 dated May 8, 2017 (German).
Written Opinion of the International Searching Authority for PCT/EP2017/053083 dated May 8, 2017 (German).

\* cited by examiner

BICYCLE GEARING HAVING A NONCIRCULAR CHAINRING

The invention relates to a bicycle gearing system with the characteristics listed in the general description.

Such gearing assemblies increase the torque of the power generated by the rider. To do this, the gearing system is installed on a bicycle, and a gear wheel, such as a toothed wheel, conveys the torque generated by the rider through a chain or toothed belt to the rear wheel.

The prior art for this is described in DE 10 2010 033 211 B4, with a bicycle gearing system in which the sun gear, planet gear, and drive axle are all contained inside the same axle housing and the drive arm is supported by a guide roller in a guideway that is also contained in the drive housing. An obvious disadvantage of known gearing assemblies is that the feet do not achieve a smooth motion while pedaling, because of differing accelerations during each rotation of the pedal crank, and therefore the rider perceives the pedaling motion as "stomping".

EP 1 863 699 B1 describes an oval chain sprocket, which has its maximum effective diameter in the area of the highest power generation, i.e., at approximately the 90° position of the pedal crank. That is the position where the maximum torque should be applied by the rider and can be transferred to the chain. In practice, however, the oval chain sprocket also leads to an uneven pedaling feel, with higher and lower foot acceleration phases during one complete rotation of the oval chain sprocket.

The invention is therefore intended to fulfill the objective of improving this type of bicycle gearing system in such a way that the rider experiences a rounder pedaling feel.

According to the invention this goal is achieved by the distinguishing features described in claim 1. An oval shape is understood to be a closed double convex curve, constantly differentiable in the same plane. Therefore, the oval shape of the toothed wheel, or gear wheel, is aligned with the spur gear unit in such a way that downward-pressure accelerations of the foot on the four-bar linkage while pedaling are reduced. The position of the pedal crank on the oval chain sprocket changes during constant rotation.

The bicycle gearing system according to the invention makes it possible to achieve maximum torque through the use of a power transmission in which a power-supplying element is guided synchronously in a uniform track. The power-supplying element here is the foot of a bicycle rider. The uniformity results first from the continuous convex shape of the track, and secondly from the reduction of absolute accelerations in the area of the power-supplying element due to the oval gear wheel. During a gear cycle, the components involved in transmitting torque, such as cranks and pedal cranks, do not change their lengths but instead simply deviate from each other.

Preferably, the gear wheel has a greater main axis diameter and a smaller secondary axis diameter, so that the main axis diameter in the gear wheel rotation direction is always offset, at an angle of 60-130°, from a connecting line running between the central bearing axis and the planet gear bearing axis. An embodiment in which the angle is 70-120°, and in particular 80-110°, is especially preferred. An even more optimal version calls for the angle to be 90-100°. In these angle ranges, an especially comfortable pedaling feel is achieved without any stomping motion of the weight-bearing foot.

It is desirable for the four-bar linkage to include a carrier plate that pivots on the central bearing axis, and for the planet gear to pivot eccentrically on that carrier plate. Advantageously, a central section of the carrier plate is connected in such a way that it cannot twist to a central shaft located on the central bearing axis. In this configuration, the carrier plate and the central shaft form a single assembly and rotate together around the central bearing axis when the pedal crank(s) is(are) operating. Preferably, the central shaft is placed concentrically inside the first and/or second sun gear. The advantage of this embodiment lies in the fact that the gearing system has especially compact dimensions in the axial direction of the central shaft.

According to a first preferred embodiment, the four-bar linkage has three pivot joints and one sliding joint. As an alternative to that embodiment, the four-bar linkage can have four pivot joints.

Preferably, a first pivot joint is located between the planet gear and the carrier plate. The first pivot joint allows the planet gear to rotate around its assigned bearing axis.

Advantageously, a second pivot joint is located between the crank and the pedal crank. The second pivot joint allows the crank to rotate relative to the pedal crank.

In addition, the four-bar linkage can have a coupling assembly located between the carrier plate and the pedal crank by means of at least a third pivot joint.

It is advantageous for the coupling assembly to include the sliding joint. The sliding joint can be a linear guide, for example. A linear guide is understood to be a mechanical guiding element used to move one assembly in a straight line with respect to another assembly. The linear guide has a certain degree of freedom. This means that the linear guide must also absorb any pull-out torque that occurs. Preferably, the linear guide includes at least one guideway with a slide that runs in it. A guideway is understood to comprise linear carrying and guiding elements placed individually or in pairs that are parallel to each other. During operation, the slide is connected inseparably to the at least one guideway and runs in it.

Preferably, the linear guide is attached in one permanent spot to the carrier plate, so that the slide travels back and forth in a radial direction with respect to the central bearing axis when the bicycle gearing system is rotating. Advantageously, the third pivot joint is located between the pedal crank and a slide in the linear guide.

Instead of the slide joint, the coupling assembly can include a pendulum arm supported by the third and a fourth pivot joint. A pendulum arm is understood to be a rigid assembly, one end of which swings out from a central position in two directions relative to a support point. This results in the advantage that the use of a slide joint, which is kinematically optimal but susceptible to failure in practice, can be avoided and all of the bearings used can be configured as pivot bearings. In this version, the four-bar linkage is driven by the continuously rotating crank. The crank always has the shortest length in the four-bar linkage. The four-bar linkage is driven by the pendulum arm, which moves with an oscillating motion around the fourth pivot joint. The crank and pendulum arm are connected to each other by a coupling formed from a section of the pedal crank between its second and third pivot joints. Both the crank and the pendulum arm pivot on the carrier plate, with the crank connected rigidly to the rotating planet gear. The third pivot joint, instead of the linear motion of a slide joint, simply has a linear motion similar to a circular orbit with a very large radius.

Preferably, the third pivot joint is located between the pedal crank and the pendulum arm, and the fourth pivot joint between the pendulum arm and the carrier plate.

It has proven to be especially favorable for the crank and the pendulum arm to be located on the same side of the pedal crank. The pedal crank thereby lies on the outside of the bicycle gearing system in an axial direction from the central shaft, which allows for an exceptionally low Q factor. Advantageously, the crank and the pendulum arm are then also located in an axial direction from the central shaft, between the carrier plate and the pedal crank.

Preferably, the fourth pivot joint is positioned on a center perpendicular placed vertically on a connecting line running between the bearing axes of the third pivot joint in its 0° and 90° positions. The two bearing axes, when in their end positions, thereby lie on a straight line that goes through the central bearing axis of the bicycle gearing system. The four-bar linkage then represents a central crank rocker mechanism.

Advantageously, the gear wheel is connected rigidly to the carrier plate and/or central shaft, so that the torque applied by the rider to the bicycle gearing system is transferred to the traction element, in particular a bicycle chain, with as little loss as possible.

The sun gear and the planet gear preferably have a fixed transmission ratio of 1:2. This causes the relative positions of the spur gear unit and the four-bar linkage to remain always constant with respect to each other during one gear rotation.

With the bicycle gearing system installed, the spur gear unit can include a stationary second sun gear, wherein the sun gear and the second sun gear can be mounted on opposite sides of a frame element and have a second planet gear, running from the second sun gear and rotating around a second planet gear axis, which interacts with a second four-bar linkage so that the second four-bar linkage includes a second crank that is connected rigidly to the second planet gear and rotatably to a second pedal crank. This results in a bicycle gearing system that has an outside sun gear and a symmetrical four-bar linkage encircling the sun gear on each side of a centrally placed central shaft. This embodiment corresponds to conventional bottom brackets that have a pedal crank on both sides of the bicycle frame.

Preferably, the second planet gear and the second four-bar linkage are offset by 180° from the planet gear and the four-bar linkage. This makes the four-bar linkage and the second four-bar linkage run symmetrically around the central bearing axis, so that, for example, the pedal crank is at the lower dead point and the second pedal crank is at the upper dead point at the same time.

For better comprehension, the invention is explained in more detail below based on 5 figures. The figures show.

Figure 1:
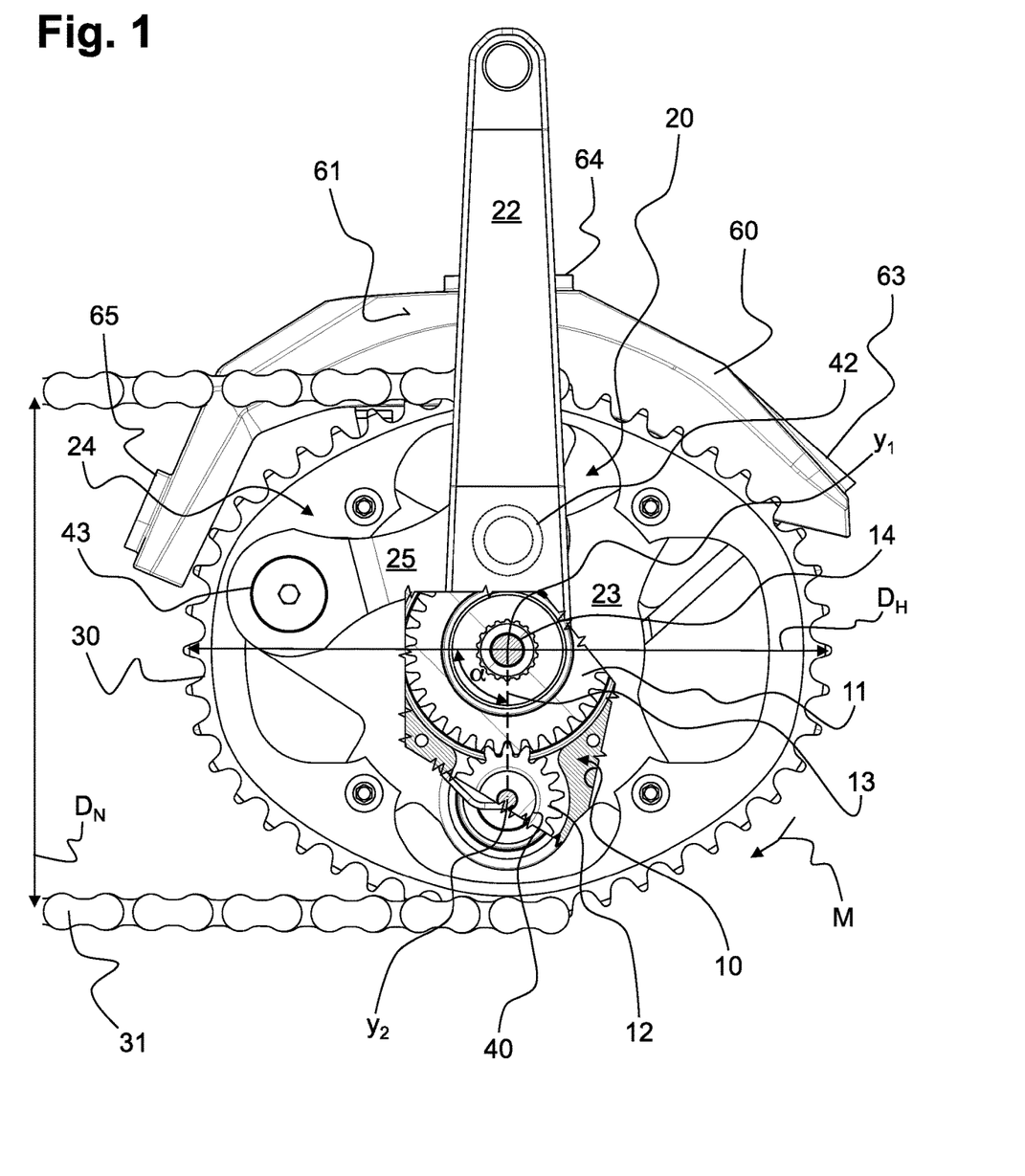
FIG. 1: a side view of the bicycle gearing system according to a first embodiment, with the pedal crank in a 0° position.
Figure 2:
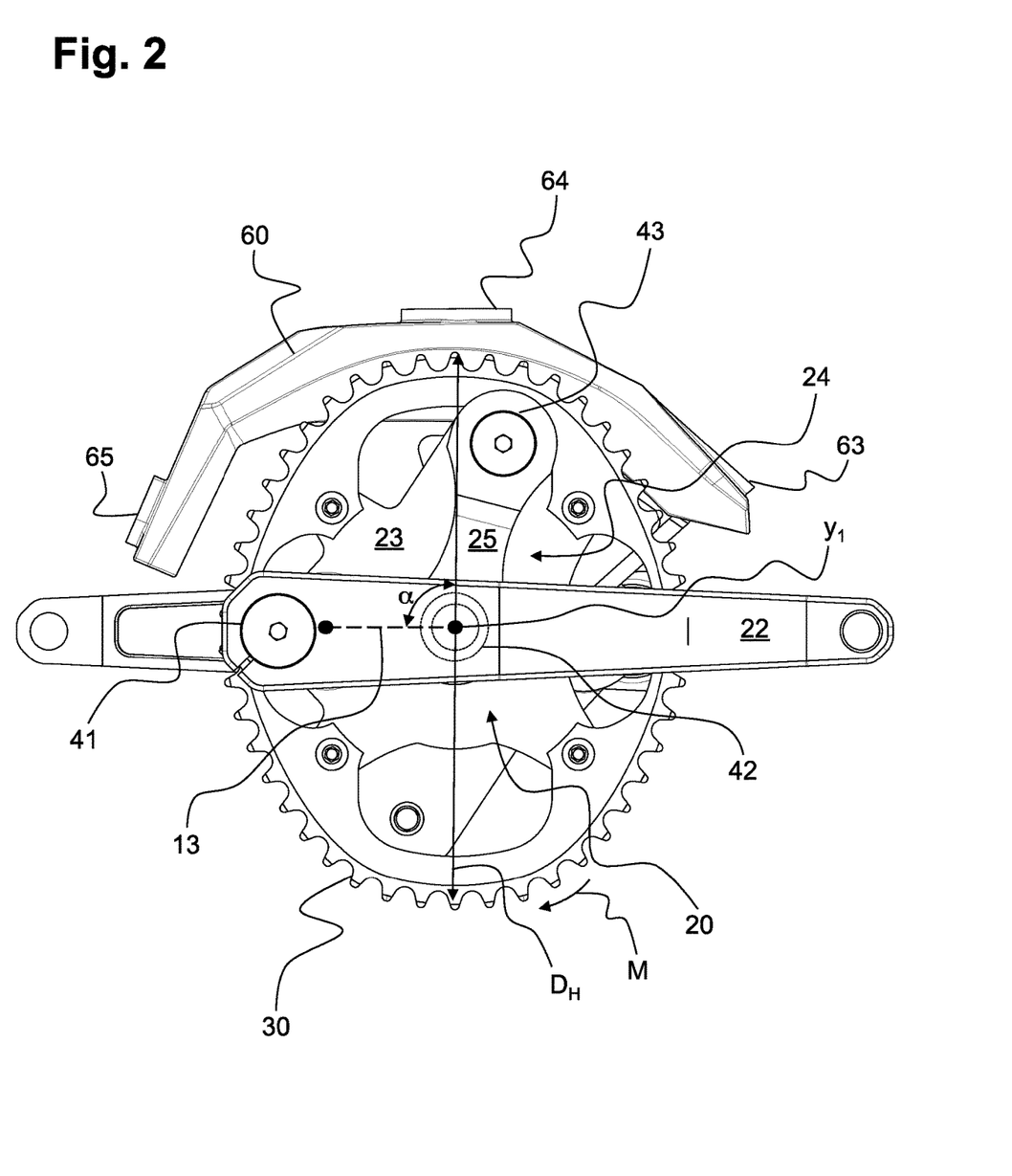
FIG. 2: a side view of the bicycle gearing system according to FIG. 1, with the pedal crank in a 90° position and the second pedal crank in a 270° position.

FIG. 1 shows a side view of the bicycle gearing system per the invention, according to a first embodiment, with a pedal crank 22 in a 0° position, and FIG. 2 shows the pedal crank 22 rotated 90° in the corresponding clockwise rotation direction M to the 90° position.

Both FIGS. 1 and 2 show the bicycle gearing system per the invention in an installation position, in which it is connected by means of a frame element 60 to a bicycle frame that is not shown here. For this purpose, the frame element 60 has three mounting flanges 63, 64, 65 for mounting on a front pipe (mounting flange 63), a saddle pipe (mounting flange 64), and a rear pipe (mounting flange 65).

On a first side 61 of the frame element 60, a stationary sun gear 11 can be seen, which together with a planet gear 12 forms a spur gear 10, as well as a four-bar linkage 20 interacting with the spur gear 10. On a second (covered here) side 62 of the frame element 60 there is a second sun gear 11a that interacts with a second four-bar linkage 20a (see FIG. 3). The drawing references for the assemblies lying behind the frame element 60 in the drawing plane of FIGS. 1 and 2 are marked with the letter "a" and can be seen predominantly in the lengthwise view in FIG. 3.

Both four-bar linkages 20, 20a relate to a central shaft 14, which runs crosswise through the frame element 60, with its front face visible. The central shaft 14 defines a central bearing axis $y_1$ of the bicycle gearing system.

A carrier plate 23, 23a is mounted on each axial end section of the central shaft 14 in such a way that it cannot twist, and it rotates in a circle together with the central shaft 1 when the bicycle gearing system is in operation. The connection between the carrier plate 23 and the central shaft 14 is made in a centrally located section of the carrier plate 23. In a section of the carrier plate 23 lying outside of that, the planet gear 12 is supported against the carrier plate 23 by a first pivot joint 40 in such a way that it can rotate.

A crank 21, 21a is either attached to the planet gear 12, 12a in such a way that it cannot rotate or forms part of a one-piece assembly together with said planet gear. The crank 21, 21a protrudes radially, offset axially, from the planet gear 12, 12a, and engages the pedal crank 22, 22a rotatably by means of a second pivot joint 41 (see FIG. 3).

A kinematic coupler 24, 24a in the shape of a pendulum arm 25, 25a is also connected rotatably to the carrier plate 23. A first end of the pendulum arm 25, 25a engages the pedal crank 22 on the side related to the frame element 2 by means of a third pivot joint 42. The opposite end of the pendulum arm 25 is fastened rotatably to the carrier plate 23 by means of a fourth pivot joint 43.

Figure 3:
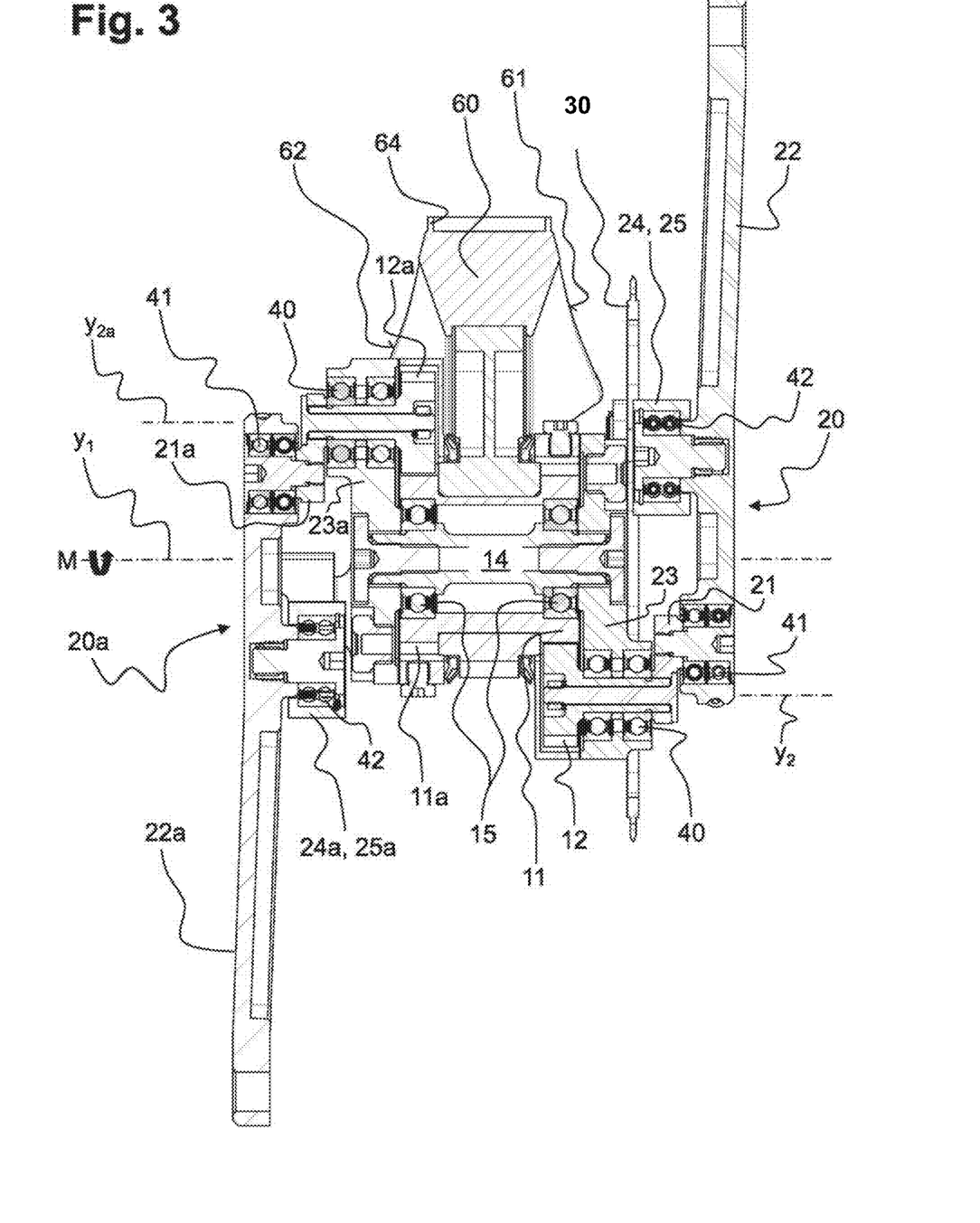
FIG. 3: a lengthwise view through the bicycle gearing system with the pedal crank in the 0° position and the second pedal crank in a 180° position.
Figure 4:
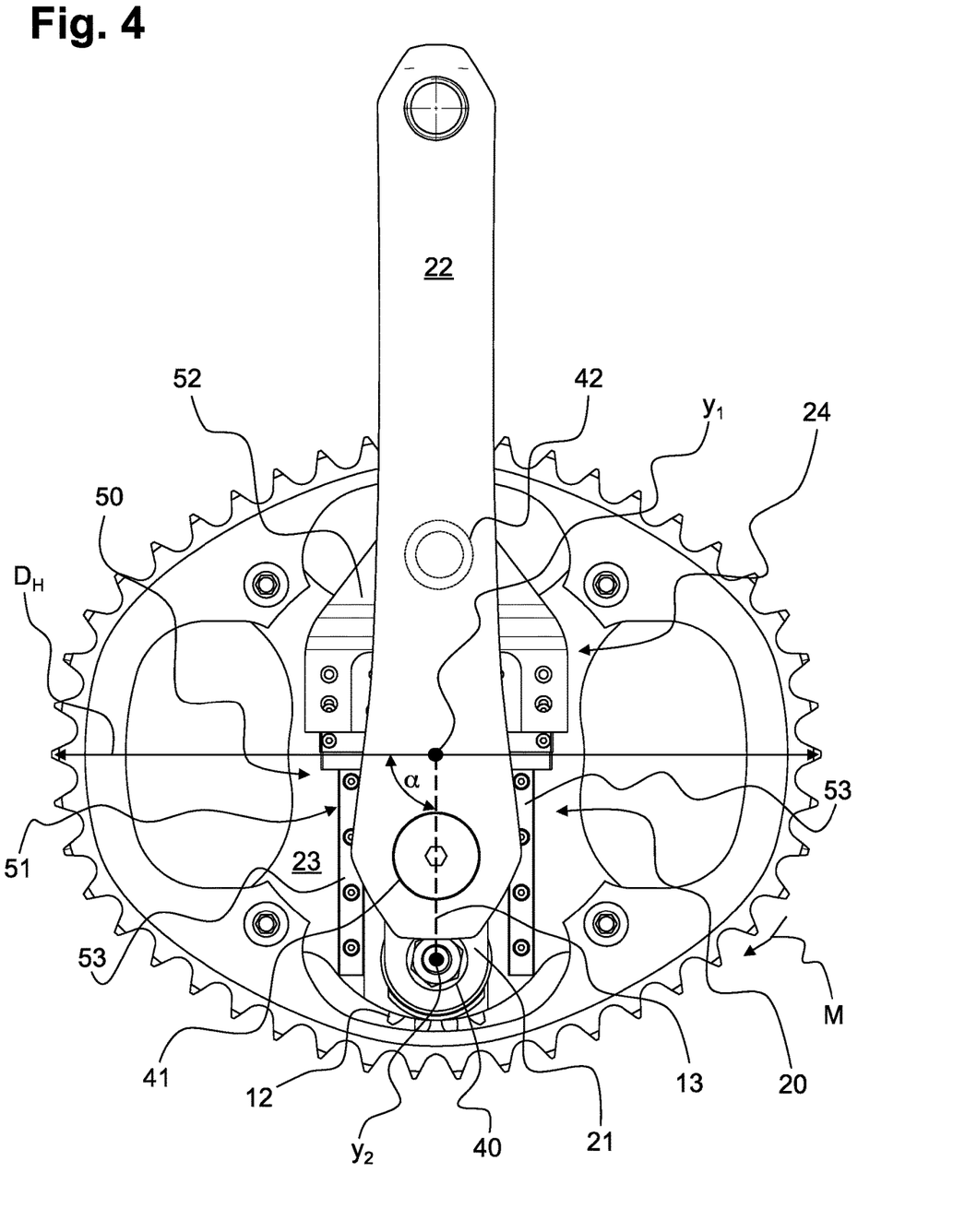
FIG. 4: a side view of the bicycle gearing system according to a second embodiment, with the pedal crank in a 0° position.

Power is provided by the bicycle rider through pedals (not shown) to the two pedal cranks 22, 22a located axially to the central shaft 14 on the outsides of the bicycle gearing system (see FIG. 3). FIGS. 1, 3, and 4 show the pedal cranks 22, 22a and the four-bar linkages 20, 20a related to each of them in a 0° position, in which the pedal crank(s) 22, 22a and the related crank 21, 21a are extended, meaning that the crank 21, 21a is shown going out from a planet gear bearing axis $y_2$, $y_{2a}$ of the planet gear 12, 12a radially inward towards the central shaft 14. This puts the free end of the pedal crank 22, 22a in its farthest outward position.

A gear wheel 30 engages the carrier plate 23 from the outside and transfers the rotational motion of the bicycle gearing system to a traction element in the form of a chain 31.

The gear wheel 30 has an oval shape spanned by a main axis diameter $D_H$ and a secondary axis diameter DN, with the main axis diameter $D_H$ intersecting a connecting line 13 at an angle α of about 90°. The connecting line 13 always intersects the central bearing axis $y_1$ of the central shaft 14 and the planet gear bearing axis $y_2$, $y_{2a}$ of the planet gear 12, 12a, regardless of the orientation of the spur gear 10. This orientation of the oval gear wheel 30 is especially effective in reducing accelerations of the foot, in particular around the area of the 90° position.

The lengthwise view in FIG. 3 also shows the second sun gear 11a, which is stationary with respect to the frame element 60 and located on the second side 62 of the frame element 2. The sun gear 11 and the second sun gear 11b are connected rigidly to each other and form a single one-piece assembly. A single one-piece assembly is understood to involve a connection that cannot be separated other than by destroying it.

The central shaft 14 runs concentrically inside the sun gears 11, 11a, and in the area of the first and second sun gears 11, 11a it is attached to each of them by means of a central shaft bearing 15 that allows it to pivot.

Figure 5:
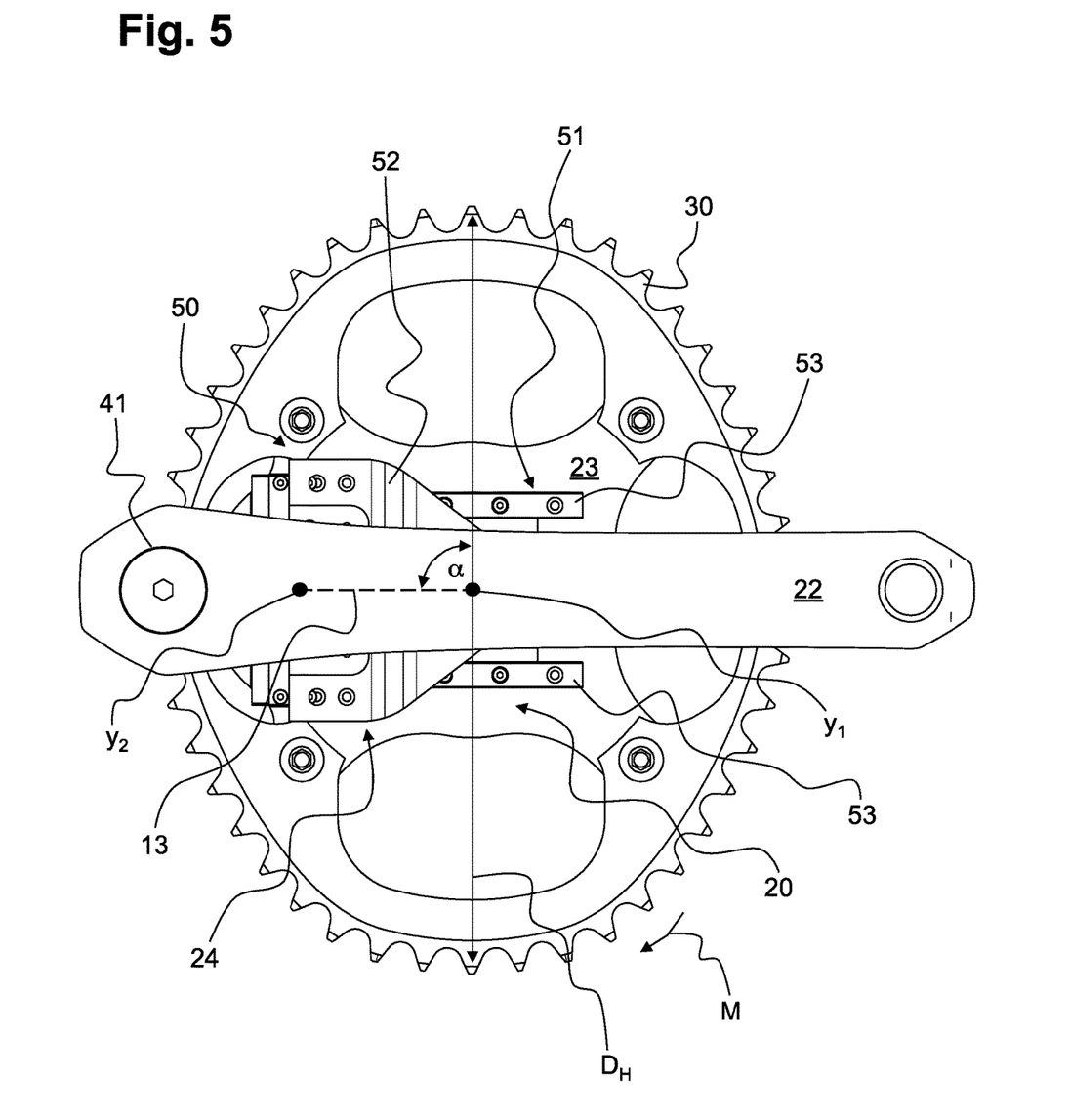
FIG. 5: a side view of the bicycle gearing system according to FIG. 4, with the pedal crank in a 90° position.

FIGS. 4 and 5 show a 0° position (FIG. 4) and a 90° position of the pedal crank 22 by comparison in a second embodiment. The second embodiment involves a four-bar linkage 20, 20a with three pivot joints 40, 41, 42 and a coupler 24 in the form of a slide joint 50. The slide joint 50 is configured as a linear guide 51, which includes two parallel guideways 53 and a slide 52 that moves axially along the extent of the guideways 53. The guideways 53 are aligned parallel to the axial extent of the pedal crank 22 at the 0° position and the 90° position.

The guideways 53 are fastened permanently to the carrier plate 23 and rotate around the central bearing axis $y_1$ when the bicycle gearing system is operating in rotation direction M. The slide 52 is also connected rotatably to the pedal crank 22 through the third pivot joint 42.

In FIG. 4, with a pedal crank 22 aligned in the 0° position, the connecting line 13 runs out from the central bearing axis $y_1$ perpendicularly through the second pivot joint 41 and to the planet gear bearing axis $y_2$. In addition, the main axis diameter $D_H$ is offset from the gear wheel 30 at an angle $\alpha$ of about 90° in rotation direction M.

In the 90° position of the pedal crank 22 according to FIG. 5, the connecting line 13 runs horizontally in the image plane between the central bearing axis $y_1$ and the planet gear bearing axis $y_2$. The main axis diameter $D_H$ is rotated by angle of about 90° to the perpendicular position.

LIST OF REFERENCE INDICATORS

10 Spur gear
11 Sun gear
11a Second sun gear
12 Planet gear
12a Second planet gear
13 Connecting line
14 Central shaft
15 Central shaft bearing
20 Four-bar linkage
20a Second four-bar linkage
21 Crank
21a Second crank
22 Pedal crank
22a Second pedal crank
23 Carrier plate
23a Second carrier plate
24 Coupler
24a Second coupler
25 Pendulum arm
25a Second pendulum arm
30 Gear wheel
31 Traction element, chain
40 First pivot joint
41 Second pivot joint
42 Third pivot joint
43 Fourth pivot joint
50 Slide joint
51 Linear guide
52 Slide, linear guide
53 Guideway
60 Frame element
61 First side frame element
62 Second side frame element
63 Mounting flange, front pipe
64 Mounting flange, saddle pipe
65 Mounting flange, rear pipe
$\alpha$ Main axis diameter/connecting line angle
$D_H$ Main axis diameter
$D_N$ Secondary axis diameter
M Gear wheel rotation direction
$y_1$ Central bearing axis
$y_2$ Planet gear bearing axis
$y_{2a}$ Second planet gear bearing axis

The invention claimed is:

1. A bicycle transmission comprising:
   a spur gear having a fixed sun gear having a central bearing axis extending thorough a center of the sun gear and a rotating planet gear running on the fixed sun gear and rotates around a planet gear bearing axis that is parallel to the central bearing axis;
   a gear wheel having an oval shape, via which a traction element is drivable, and
   a four-bar linkage connected to the gear wheel and which interacts with the spur gear, the four-bar linkage comprising a pedal crank and a crank, the crank fixedly connected to the planet gear and connected in a rotationally-movable manner to the pedal crank.

2. A bicycle transmission according to claim 1, wherein the oval gear wheel has a major axis diameter and a minor axis diameter and the major axis diameter is always offset at an angle of 60° to 130° from a connecting line between the central bearing axis and the planet gear bearing axis.

3. A bicycle transmission according to claim 1 wherein the four-bar linkage rotates around the central bearing axis and is comprised of a carrier plate rotatably mounted around the central bearing axis, such that planetary gear can rotate eccentrically around the central bearing axis.

4. A bicycle transmission according to claim 1 wherein the linkage has three pivot joints and a sliding joint.

5. A bicycle transmission according to claim 1 wherein the linkage has four pivot joints.

6. A bicycle transmission according to claim 3 also comprising a pivot joint between the planet gear and the carrier plate.

7. A bicycle transmission according to claim 3, wherein the linkage comprises a coupling having at least one pivot joint which is arranged between the carrier plate and the crank.

8. A bicycle transmission according to claim 3, wherein the linkage comprises a coupling comprised of a sliding joint.

9. A bicycle transmission according to claim 3, wherein the linkage comprises a coupling having a third pivot joint, a fourth pivot joint and a pendulum arm.

10. A bicycle transmission according to claim 9 wherein the third pivot joint is between the crank and the pendulum arm and the fourth pivot joint is between the pendulum arm and the carrier plate.

11. A bicycle transmission according to claim 1 also comprising a central shaft on the central bearing axis and the gear wheel is rotatably connected to the central shaft.

12. A bicycle transmission according to claim 1, wherein the spur gear further comprises a frame element, a fixed second sun gear, wherein the sun gear and the second sun gear are on opposite sides of the frame element, and a second planet gear rotating about a second planet gear bearing axis and engaging the second sun gear, and further comprising a second linkage, wherein the second four-bar linkage comprises a second crank, which is fixedly connected to the second planet gear and is connected in a rotationally-movable manner to a second pedal crank.

13. A bicycle transmission comprising:
- a spur gear that has a stationary sun gear with a central bearing axis that intersects its center and a planet gear, running on the sun gear, that rotates around a planet gear bearing axis,
- a four-bar linkage, interacting with the spur gear, the four-bar linkage comprising a crank connected rigidly to the planet gear and connected rotatably to a pedal crank, and
- a gear wheel that can drive a traction element, the gear wheel connected to the four-bar linkage,
- wherein the gear wheel has an oval shape with a greater main axis diameter and a small secondary axis diameter so that the main axis diameter in a rotation direction of the gear wheel is always offset at an angle of 60° to 130° from a connecting line running between the central bearing axis and the planet gear bearing axis.

* * * * *